Aug. 11, 1931.  F. B. PFEIFFER ET AL  1,818,504
METHOD OF HANDLING AND SEPARATING SHEET MATERIALS
Filed June 15, 1927
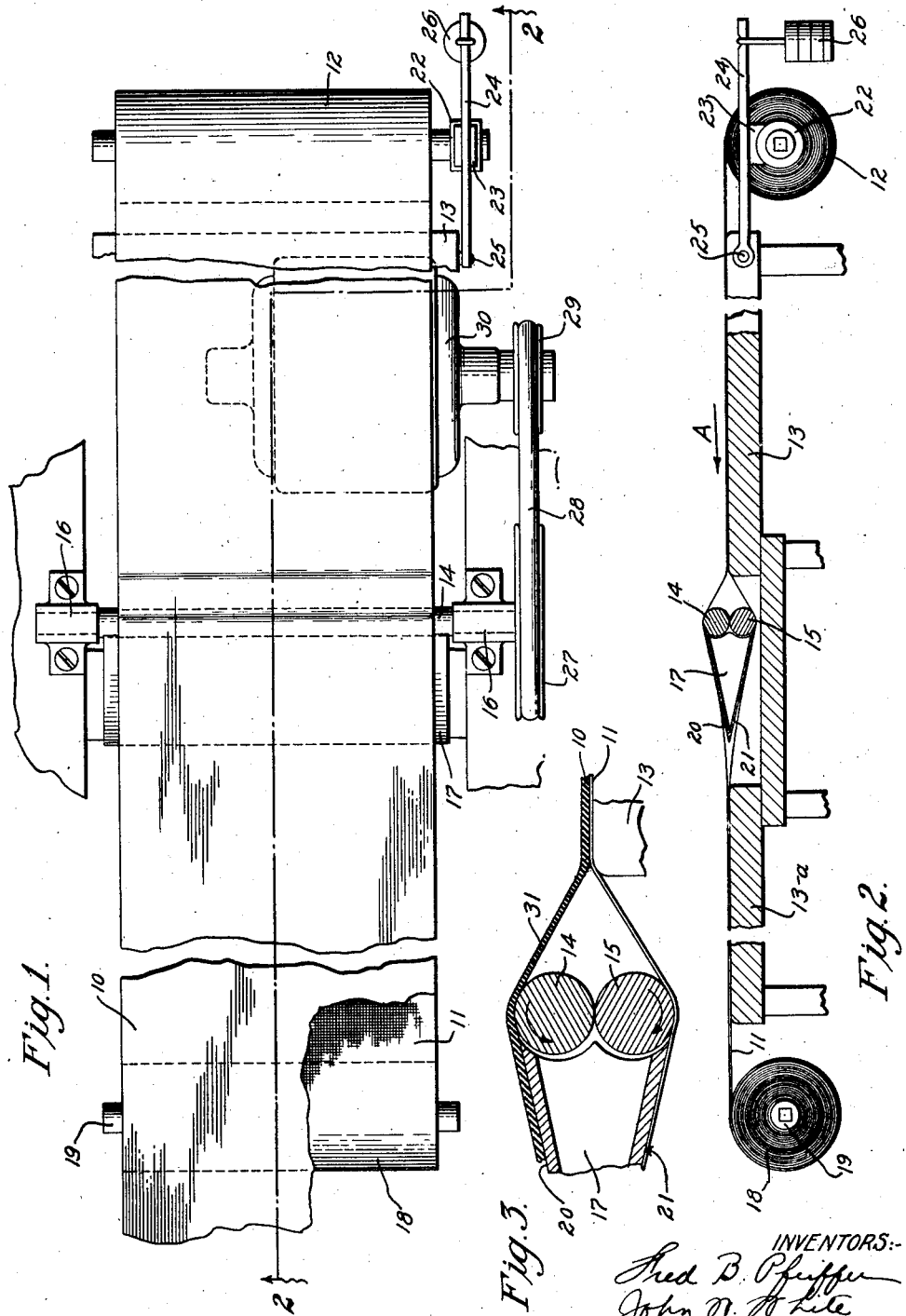
INVENTORS:-
Fred B. Pfeiffer
John N. White
By Rogers, Kennedy & Campbell
ATTORNEYS.

Patented Aug. 11, 1931

1,818,504

UNITED STATES PATENT OFFICE

FRED B. PFEIFFER, OF AKRON, AND JOHN W. WHITE, OF BARBERTON, OHIO, ASSIGNORS TO SEIBERLING RUBBER COMPANY, A CORPORATION OF DELAWARE

METHOD OF HANDLING AND SEPARATING SHEET MATERIALS

Application filed June 15, 1927. Serial No. 199,113.

This invention is directed to a novel method and apparatus for separating adhesive sheet materials.

In producing and handling tacky sheet materials, such as sheet rubber or rubberized fabric, it is customary to wind the sheet material upon a stock roll with a suitable liner which prevents the adjacent convolutions of the tacky material from sticking together. Such a liner usually comprises a sheet of woven fabric and is ordinarily associated with the tacky rubber sheet as the latter leaves the calendar or like machine. At this time, the rubber is hot and plastic, and the pressure imposed on the two superimposed sheets in the winding operation causes the rubber to flow into the interstices of the fabric. The rubber sheet usually remains in the stock roll with the liner for at least twenty-four hours, and difficulties have been experienced in separating the two materials for subsequent working, due to the firm surface union between the rubber sheet and the fabric liner. When the rubber sheet is raw gum stock, such as is used for building inner tubes for tires, it frequently becomes so stretched and distorted in being separated from the liner that it cannot be used; and in any case, allowances must be made for such stretching and distortion, involving a considerable waste of materials. When the material is rubberized fabric, the liners are often torn in the separating operation, and in view of the cost of the liners, it is desired to use them over again a number of times. It will be evident therefore, that the separation of the tacky materials from their liners has necessarily slowed down production, and has resulted in considerable loss of time, labor and material. In addition to these objections, the problem of compounding the rubber has been complicated by rendering the materials less tacky than is desirable for best working conditions.

The present invention overcomes these and other objectionable features of the prior art, and provides a new method and a novel apparatus for quickly separating the rubber sheet from the fabric liner without damage to either of them. To this end, specifically, the invention contemplates feeding the adhering sheets over a long table equipped with a pair of oppositely rotated separating rollers which extend across the path of movement of the joined sheets, in such a manner as to cause said sheets to diverge, one of them being passed by the outside of one roller, and the other sheet by the outside of the other roller. The separating roller over which the rubber sheet passes is rotated at a peripheral speed greater than the speed of feeding or longitudinal movement of the united sheets, so that the rubber (which firmly grips the roller) will be stretched and drawn off the liner at a travelling speed greater than that of the liner. As a result, the two sheets are easily and safely separated, after which they may be re-rolled without likelihood of their sticking together again. These and other features and advantages of the invention will be readily apparent from the following description, in connection with the accompanying drawings, wherein the invention has been shown by way of illustration, and wherein Fig. 1 is a diagrammatic top plan view of one form of apparatus for carrying out the new method;

Fig. 2 is a vertical longitudinal sectional view on line 2—2 of Fig. 1; and

Fig. 3 is an enlarged detail edge view showing the action of the separating rollers on a rubber sheet.

In carrying out the invention, the tacky gum sheet 10 and liner 11 are taken off a stock supply roll 12 and fed longitudinally over a table 13 in the direction of the arrow A in Fig. 2. The sheets 10 and 11 closely adhere, and in fact are quite firmly united for the reasons previously mentioned. Two rollers 14 and 15, journaled for rotation in fixed bearings 16, run in frictional engagement with each other and are disposed in the path of movement of the superimposed sheets 10 and 11, as best shown in Fig. 2. In being carried past the rollers 14 and 15, the sheets 10 and 11 are caused to diverge, the rubber sheet 10 being led over the upper roller 14, and fabric liner 11 under the lower roller 15. The two rollers are rotated at a peripheral speed higher than the speed at which the sheets are drawn over or along the table 13, for reasons to be more fully explained, although such higher speed could be confined to the upper roller 14 if the two rollers were placed out of contact and the lower roller driven independently or mounted to rotate idly.

As the sheets 10 and 11 pass by the opposite sides of the separating rollers, they are guided away from the same by means of a shield 17, and they are then drawn over a table portion 13—a and rewound upon a roll 18. The end of the liner 11 may be secured to a suitable arbor or mandrel 19 upon which the roll 18 is mounted, the rotation of the arbor being accomplished by a belt drive, or the like, not shown. The shield or guide member 17, which may be mounted in fixed position in any suitable manner, is provided with converging upper and lower surfaces 20 and 21 substantially tangent to the rollers 14 and 15 and extending away from the same.

As the sheet materials are rewound upon the roll 18, the travelling web of the liner 11 on the table 13 is under tension, and said tension may be more fully assured by having a suitable friction brake, or the like, associated with the mounting of the stock roll 12. Such a mechanism has been illustrated diagrammatically as including a pulley or collar 22, mounted for rotation with the stock roll 12, and a friction block 23 carried by a lever 24 and engaged with the periphery of said collar 22, the lever 24 being fulcrumed at 25 and normally moved downwardly toward the collar 22 by weights 26, or the like.

The operation of the device is as follows: As the two joined sheets are drawn along the table and carried past the two separating rollers, they will be separated from each other in a smooth and uniform, yet forcible, manner by the pulling forces set up in opposite directions from the line of attachment of the two sheets. The lines of force will depend largely upon the amount of deflection of the travelling sheets by the two separating rollers or upon the diameter of the rollers, although they will also depend somewhat upon the degree of adhesion existing between the two sheets and the amount of resistance offered to their separation. However, the device is well adapted to take care of any such possible variations because the pulling forces will automatically increase with each increase of resistance to separation; that is to say, the greater the adhesion existing between the two sheets, the nearer the line of separation will approach the two separating rollers and thus the greater the deflection of the two separated sheets in travelling over the rollers. The foregoing action will take place even if the peripheral speed of the separating rollers were made to conform to the linear speed of the travelling sheets, as would or could be the case in separating a rubberized fabric strip from the liner. However, in separating a pure gum strip from the fabric liner, which is the condition illustrated in the drawing, the separating rollers should be driven at a higher peripheral speed than the linear speed of the travelling sheets, as above described. The point is that a pure gum strip will stretch or elongate much more readily than the fabric liner to which it is attached and hence the same pulling force exerted by the two separating rollers in tearing these two sheets apart, would have the effect of stretching or lengthening out the pure gum strip without stretching or elongating the fabric liner to the same extent or, in fact, to any appreciable extent. When the separating rollers are thus speeded up, the rubber sheet after it is separated from the fabric liner will be caused to travel fast enough to make up for the degree of stretch or elongation imparted to it in effecting the separation of the two sheets, the tacky nature of the rubber being sufficient to enable the separating rollers to effect this result without slippage. This action is clearly depicted in Fig. 3, where the separated portion 31 of the rubber sheet 10 is illustrated as being thinned out due to the stretching which takes place because of the increased speed of rotation of the separating roller 14. Comparatively speaking, the fabric liner 11 is inextensible and hence its speed of travel need not be and is not increased as it passes over the lower roller 15. While this latter roller is rotated at the same peripheral speed as that of the upper roller 14, due to the frictional engagement between the two, it will have no effect upon the travelling liner, which will be carried along at the linear speed determined by the feeding movement of the two sheets, the roller 15 slipping upon the liner in an idle fashion. If desired, the roller 15 could be arranged out of contact wit' the roller 14, in which case it could be driven independently or mounted to rotate idly. Stated in brief, to bring about the desired result, it is essential that the rubber sheet 10 and the fabric liner 11, or more properly speaking those portions which diverge after separation, should be made to travel at relatively different speeds in passing over the separating rollers, such that the diverging portion of the rubber sheet will travel enough faster than the diverging portion of the fabric liner to compensate for the elongation of the rubber sheet which takes place in pulling it away from the fabric liner.

After passing over the upper roller 14 and in descending the inclined surface 20 of the shield 17, the rubber sheet 10 is caused to assume the same speed of travel as that of the converging portion of the liner in ascending the inclined surface 21 of the shield, and as the two sheets meet beyond the shield, they will of course be drawn along at the original speed of the feeding movement. The reduced speed of the travelling rubber sheet, after passing the separating roller 14, has the effect of restoring it to its original condition, since the roller 14, which naturally tends to advance it in its stretched condition at a faster speed than the speed of travel of the liner, takes up the stretch imparted to the sheet in separating it from the liner and crowds it back to its original thickness, a condition also illustrated in Fig. 3. This peculiar action of the separating roller upon the rubber sheet is uniform throughout the entire length, and consequently the calendered gauge of the sheet is unchanged, notwithstanding the stretching of the sheet in separating it from the liner.

In rewinding the rubber sheet with the liner after the two have been separated in the foregoing manner, they will have little or no tendency to reunite, because the rubber is cooled rather than plastic and is more or less resilient. Besides, in being separated from the liner, the rubber sheet is smoothed down somewhat on its inner surface by contact with the separating roller 14.

As has been previously stated, the invention is adaptable for use in handling rubberized fabric and the like, with liners, as well as raw gum stock, although it is most suitable for the latter, and it will be evident from the foregoing description that such sheet materials may be quickly and easily separated without likelihood of injury. Instead of rewinding the rubber with the liner, it may be removed directly from the table 13—a for further working and the liner rewound by itself. Furthermore, instead of having the separating rollers associated with a table as above described, they may be built into or mounted adjacent to the building machine with which the rubber or rubberized sheet is to be used, whereby to eliminate an extra operation in separating the stock from the liner. The invention is, of course, susceptible of other modifications, and the right is herein reserved to make such changes as fall within the scope of the appended claims without departing from the spirit of the invention.

Having thus described our invention, what we claim is:

1. A method of separating joined sheet materials, which consists in feeding the sheet materials longitudinally, changing the direction of travel of one of said sheets with reference to the other during the longitudinal movement, and increasing the speed of travel of one sheet relatively to that of the other.

2. A method of separating joined sheet materials having different elongated properties, which consists in feeding the sheet materials longitudinally, causing the sheets to diverge as they move longitudinally, and increasing the speed of travel of the sheet having the greater elongation as the two diverge.

3. A method of separating joined sheet materials having different elongation properties, which consists in feeding the sheet materials longitudinally, causing the sheets to diverge as they move longitudinally, temporarily increasing the speed of travel of one of the sheets relatively to that of the other as they diverge, and thereafter restoring said sheets to their original speed.

4. A method of treating adhering sheet materials, which consists in feeding the sheet materials longitudinally, passing the sheets around opposite sides of a rotating roller to cause them to diverge in their longitudinal travel and break the adhesion between the sheets, bringing the sheets back into superimposed relation, and winding them together without causing the sheets to adhere.

5. A method of separating joined sheet materials having different elongation properties, which consists in feeding the sheet materials longitudinally, passing one of the sheets over a separating roller, and rotating said roller at a peripheral speed greater than the speed of the feeding movement.

6. A method of separating a tacky rubber sheet from a fabric liner, which consists in feeding the materials longitudinally with tension on the liner, causing a divergence of travel between the rubber sheet and the liner, and increasing the speed of travel of the rubber sheet as it diverges from the liner.

7. A method of separating a tacky rubber sheet from a fabric liner with which it is wound in a stock roll, which consists in unwinding the superimposed sheets from the stock roll, with tension on the liner, causing divergence of travel between the rubber sheet and the liner by passing them around opposite sides of a separating roller, and increasing the speed of travel of the rubber sheet by rotation of said roller at a peripheral speed greater than the linear speed of the liner.

8. A method of separating a tacky rubber sheet from a fabric liner with which it is wound in a stock roll, which consists in unwinding the superimposed sheets from the stock roll, causing divergence of travel between the rubber sheet and the liner by passing them around opposite sides of a separating roller, temporarily increasing the speed of travel of the rubber sheet by rotation of said roller at a peripheral speed greater than the linear speed of the liner, restoring the speed of travel of the rubber sheet to that of the liner, and rewinding them together.

9. Steps in the method of treating sheet materials, which consist in unwinding adhering sheets from a stock roll, separating the sheets as they are unwound to break the adhesion between the sheets and rewinding them together without causing the sheets to adhere.

In testimony whereof we have affixed our signatures hereto.

FRED B. PFEIFFER.
JOHN W. WHITE.